US008260768B2

(12) United States Patent
Wang et al.

(10) Patent No.: US 8,260,768 B2
(45) Date of Patent: Sep. 4, 2012

(54) TRANSFORMATION OF DIRECTED ACYCLIC GRAPH QUERY PLANS TO LINEAR QUERY PLANS

(75) Inventors: Song Wang, Austin, TX (US); Chetan Kumar Gupta, Austin, TX (US); Abhay Mehta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 408 days.

(21) Appl. No.: 12/697,093

(22) Filed: Jan. 29, 2010

(65) Prior Publication Data

US 2011/0191324 A1    Aug. 4, 2011

(51) Int. Cl.
*G06F 17/30* (2006.01)
*G06F 7/00* (2006.01)

(52) U.S. Cl. ...................................................... 707/718
(58) Field of Classification Search .......... 707/713–721, 707/999.001–999.005, E17.008
See application file for complete search history.

(56) References Cited

U.S. PATENT DOCUMENTS

| 7,080,088 | B1 * | 7/2006 | Lau ........................ 1/1 |
| 2006/0167845 | A1 | 7/2006 | Xia et al. | |
| 2006/0218123 | A1 * | 9/2006 | Chowdhuri et al. .............. 707/2 |
| 2007/0282626 | A1 * | 12/2007 | Zhang et al. ...................... 705/1 |
| 2008/0222093 | A1 | 9/2008 | Fan et al. | |
| 2009/0070313 | A1 | 3/2009 | Beyer et al. | |
| 2009/0254774 | A1 | 10/2009 | Chamdani et al. | |
| 2010/0030896 | A1 * | 2/2010 | Chandramouli et al. ..... 709/224 |

FOREIGN PATENT DOCUMENTS

WO    2007134407 A1    11/2007

OTHER PUBLICATIONS

Theodore Johnson et al., "A Heartbeat Mechanism and Its Application in Gigascope", Proceedings of the 31st VLDB Conference, Trondheim, Norway, 2005, p. 1079-1088.
Shivnath Babu et al., "Adaptive Caching for Continuous Queries", in ICDE, 2005, p. 1-22.
Shivnath Babu et al., "Adaptive Ordering of Pipelined Stream Filters", SIGMOD 2004, Jun. 13-18, 2004, Paris, France, 13 pages.
Timothy M. Sutherland et al., An Adaptive Multi-Objective Scheduling Selection Framework for Continuous Query Processing, In Ideas, Jul. 2005, 10 pages.
Daniel J. Abadi et al., "Aurora: A New Model and Architecture for Data Stream Management", The VDLB Journal, 2003, 18 pages.

(Continued)

*Primary Examiner* — Jacob F Bétit
*Assistant Examiner* — Amanda Willis

(57) ABSTRACT

Methods, computer-readable storage media and computer systems are provided for transforming a directed acyclic graph ("DAG") query plan into a linear plan. A DAG query plan may include a first operator and a second operator that are scheduled to be executed in parallel. The DAG query plan may be modified so that the first and second operators are executed in series as an upstream operator and a downstream operator. A data unit output from the upstream operator may be marked to indicate that the data unit has been processed by the upstream operator. The data unit received as input at the downstream operator may be inspected to determine whether the data unit has been marked. Once in linear form, the query plan may be optimized to conserve computing resources.

17 Claims, 3 Drawing Sheets

OTHER PUBLICATIONS

Elke A. Rundensteiner et al., "CAPE: Continuous Query Engine with Heterogeneous-Grained Adaptivity", Proceedings of the 30th VLDB Conference, Toronto, Canada, 2004, p. 1353-1356.

Brian Babcok et al., "Chain: Operator Scheduling for Memory Minimization in Data Stream Systems", SIGMOD 2003, Jun. 9-12, 2003, San Diego, California, 12 pages.

Chetan Gupta et al., "CHAOS: A Data Stream Analysis Architecture for Enterprise Applications", In CEC'09, 2009, 8 pages.

Tolga Urhan et al., "Dynamic Pipeline Scheduling for Improving Interactive Query Performance", Proceedings of the 27th VLDB Conference, Roma, Italy, 2001, 10 pages.

Mohamed A. Sharaf et al., "Efficient Scheduling of Heterogeneous Continuous Queries", VLDB 2006, Sep. 2006, Seoul, Korea, 12 pages.

Bugra Gedik et al., "SPADE: The System S Declarative Stream Processing Engine", SIGMOD 2008, Jun. 9-12, 2008, Vancouver, BC, Canada, p. 1123-1134.

Lukasz Golab et al., "Issues in Data Stream Management", SIGMOD Record, vol. 32, No. 2, Jun. 2003, p. 5-14.

Yijian Bai et al., "Minimizing Latency and Memory in DSMS: a Unified Approach to Quasi-Optimal Scheduling", SSPS 2008, Mar. 29, 2008, Nantes, France, 10 pages.

Luping Ding et al., "MJoin: A Metadata-Aware Stream Join Operator", In DEBS, 2003, 8 pages.

M.A. Hammad et al., "Nile: A Query Processing Engine for Data Streams", In ICDE, 2004, 1 page.

Eric Lo et al., "OLAP on Sequence Data", SIGMOD 2008, Jun. 9-12, 2008, Vancouver, BC, Canada, 12 pages.

Don Carney et al., "Operator Scheduling in a Data Stream Manager", Proceedings of the 29th VLDB Conference, Berlin, Germany, 2003, 12 pages.

Yijian Bai et al., "Optimizing Timestamp Management in Data Stream Management Systems", In ICDE, 2007, 5 pages.

Ronald W. Wolff, "Poisson Arrivals See Time Averages", Operations Research, vol. 30, No. 2, Mar.-Apr. 1982, Operations Research Society of America, p. 223-231.

Rajeev Motwani et al., "Query Processing Resource Management, and Approximation in a Data Stream Management System", Proceedings of the 2003 CIDR Conference, 12 pages.

Qingchun Jiang et al., "Scheduling Strategies for Processing Continuous Queries Over Streams", Technical Report CSE-2003-30, Department of Computer Science and Engineering, University of Texas at Arlington, Arlington, Texas 76019, 18 pages.

Jiawei Han et al., "Stream Cube: An Architecture for Multi-Dimensional Analysis of Data Streams", Distributed and Parallel Databases, 2005, 25 pages.

Sirish Chandrasekaran et al., "TelegraphCQ: Continuous Dataflow Processing for an Uncertain World", Proceedings of the 2003 CIDR Conference, 12 pages.

* cited by examiner

TRANSFORMATION OF DIRECTED ACYCLIC GRAPH QUERY PLANS TO LINEAR QUERY PLANS

BACKGROUND

Numerous data streams exist that may be harnessed for analytics and reporting. A data stream management system ("DSMS") may be provided with a query plan that dictates how the DSMS will capture and process data from a data stream. As query plans become more complex, they require more resources such as memory and CPU processing time.

One type of complex query plan is a directed acyclic graph ("DAG") query plan. A DAG query plan includes two or more operators that are executed in parallel. DAG query plans introduce issues that are not found in linear query plans. For example, DAG query plans often include operators with multiple fan-in connections, such as multi-way joins and union operators. Those operators typically process input stream tuples (i.e., the operator performs some function involving the tuples as input) in the order of their timestamps, irrespective of the connections from which the tuples arrive. Thus, a tuple may have to wait for the arrival of other tuples before being processed by a join operator. This forced delay may be referred to as input delay synchronization ("IDS").

Another issue arises where a DAG query plan has an operator with multiple fan-out connections. For example, copy operators are used to duplicate shared output. The same output tuples need to be passed to multiple down stream operators. The output tuples should not be dropped until processed by all downstream operators. This may be referred to as shared output synchronization ("SOS").

For purposes of optimizing a query plan to reduce memory and CPU consumption, DAG query plans like may be partitioned into segments as basic units for scheduling. At runtime, however, the effectiveness of such optimization may be reduced where IDS causes multiple-input operators to block and delay progression of tuples through the segments. Additionally, SOS requires synchronized scheduling of query segments that share the same stream input. Although tuples may be processed in batches, as batch size increases, longer idle time may be required for IDS and a larger buffer may be required for SOS.

DETAILED DESCRIPTION

Methods, computer-readable media and computer systems are provided for transforming a DAG query plan into a linear query plan (also referred to herein as "linearizing" a DAG query plan) virtually for stream processing using minimal runtime computing resources. Operators of a DAG query plan may be rescheduled so that instead of being executed in parallel, they are executed in series. Data units that are processed and passed between query operators may be marked or "enriched" with metadata to record the data unit's origin and its path through the query plan. As a data unit is received at an operator, the operator may inspect the metadata associated with the data unit to determine whether to process the data unit, to allow the data unit to bypass, or to drop the data. One type of data unit that may be passed between and processed by operators is a tuple. Although this term "tuple" is used repeatedly herein, this is not meant to be limiting, and other types of data units may be processed by and passed between operators as described herein.

Figure 1:
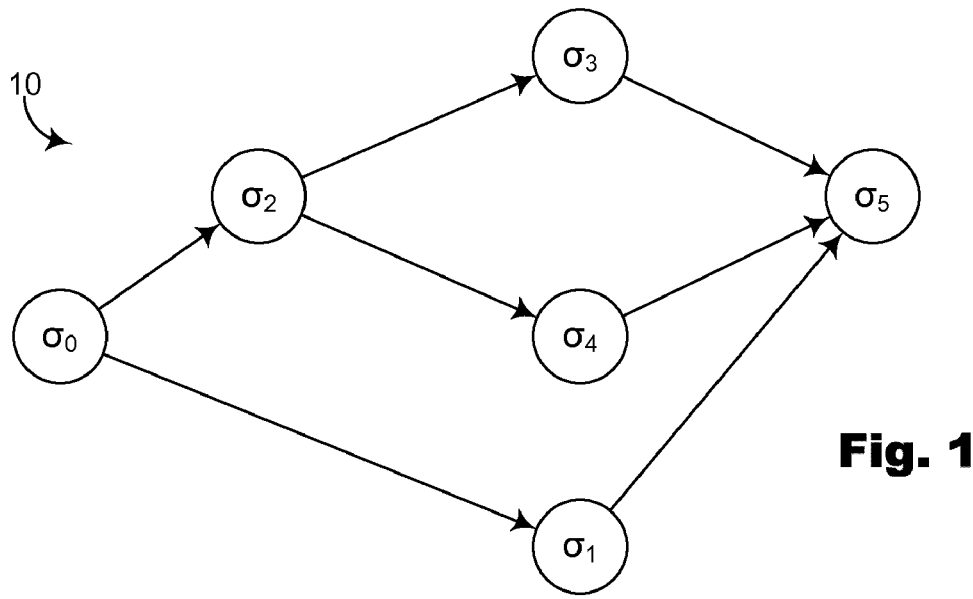
FIG. 1 depicts schematically an exemplary DAG query plan that may be transformed into a linear plan using disclosed systems and methods.

FIG. 1 depicts schematically an exemplary DAG query plan 10. Each operator is characterized as an abstract stream operator $\sigma_i$ which achieves a relational transformation of input stream tuple(s) into output stream tuple(s). Each operator $\sigma_i$ acts as both a stream consumer and a stream producer, and may have an inner buffer. This abstraction is sufficient to capture semantics of common relational operations such as select, project, join, aggregate and various user-defined functions. Each operator a may be triggered by stream input and may run repeatedly over each input stream tuple to map the input tuple to an output tuple.

The "selectivity" $\theta_i$ of each operator—i.e. a ratio of tuples output from the operator and tuples received by the operator—may be known. The per-tuple processing time and arrival rate $\lambda$ of each input stream for each operator also may be known. For a multiple-input operator, like a multi-way join, the selectivity of each input may be calculated and may not be identical for all input streams.

The DAG query plan 10 of FIG. 1 demonstrates the logical dependence between connected operators. Different intermediate streams (inputs or outputs from an operator) may be dependent on each other. For example, $\sigma_5$ receives input from three different operators ($\sigma_3$, $\sigma_4$ and $\sigma_1$). Thus, the stream from $\sigma_1$ to $\sigma_5$ is dependent upon the streams from $\sigma_3$ to $\sigma_5$ and from $\sigma_4$ to $\sigma_5$, and IDS may be enforced accordingly.

Figure 2:
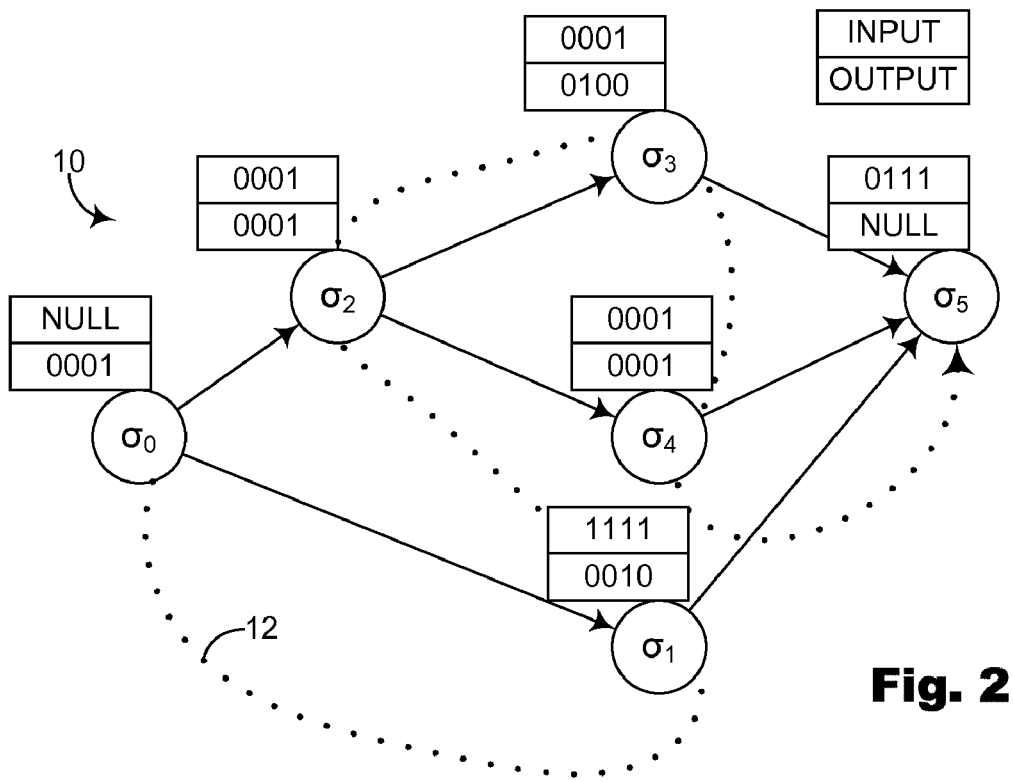
FIG. 2 depicts schematically the exemplary DAG query plan of FIG. 1 transformed to a linear plan, according to an embodiment of the invention.

By enriching stream tuples with metadata using disclosed methods, it is possible to transform a DAG query plan such as that shown in FIG. 1 into a linear query plan such as that shown in FIG. 2 while maintaining these logical dependencies and paying a minimal computational cost. Once a query plan is linear, various query plan optimizations may be applied that are unavailable or less applicable to DAG query plans.

Tuples may be marked (or enriched) with metadata for the purpose of identification of the tuple. Metadata associated with a tuple may be inspected at each operator of the query plan to determine from which queue of the operator in the original DAG query plan the tuple originates. This allows the operator to determine whether it should process or drop the tuple, or allow the tuple to bypass the operator (e.g., by outputting a copy of the tuple as received). The metadata with which a tuple is marked therefore represents a path of operators traversed by the tuple during processing. As a result, tuples that would have originally traversed any number of separate paths of a DAG query plan may instead be formed into a single queue, with operators spaced along the queue.

FIG. 2 depicts schematically an example of how the DAG query plan of FIG. 1 may be altered or rescheduled into a linear query plan, according to an embodiment of the invention. The operators are shown rescheduled in an order indicated by the path 12. Path 12 is only one example of how the DAG query plan 10 of FIG. 1 may be linearized; the operators may be reordered in other sequences as well.

Figure 3:
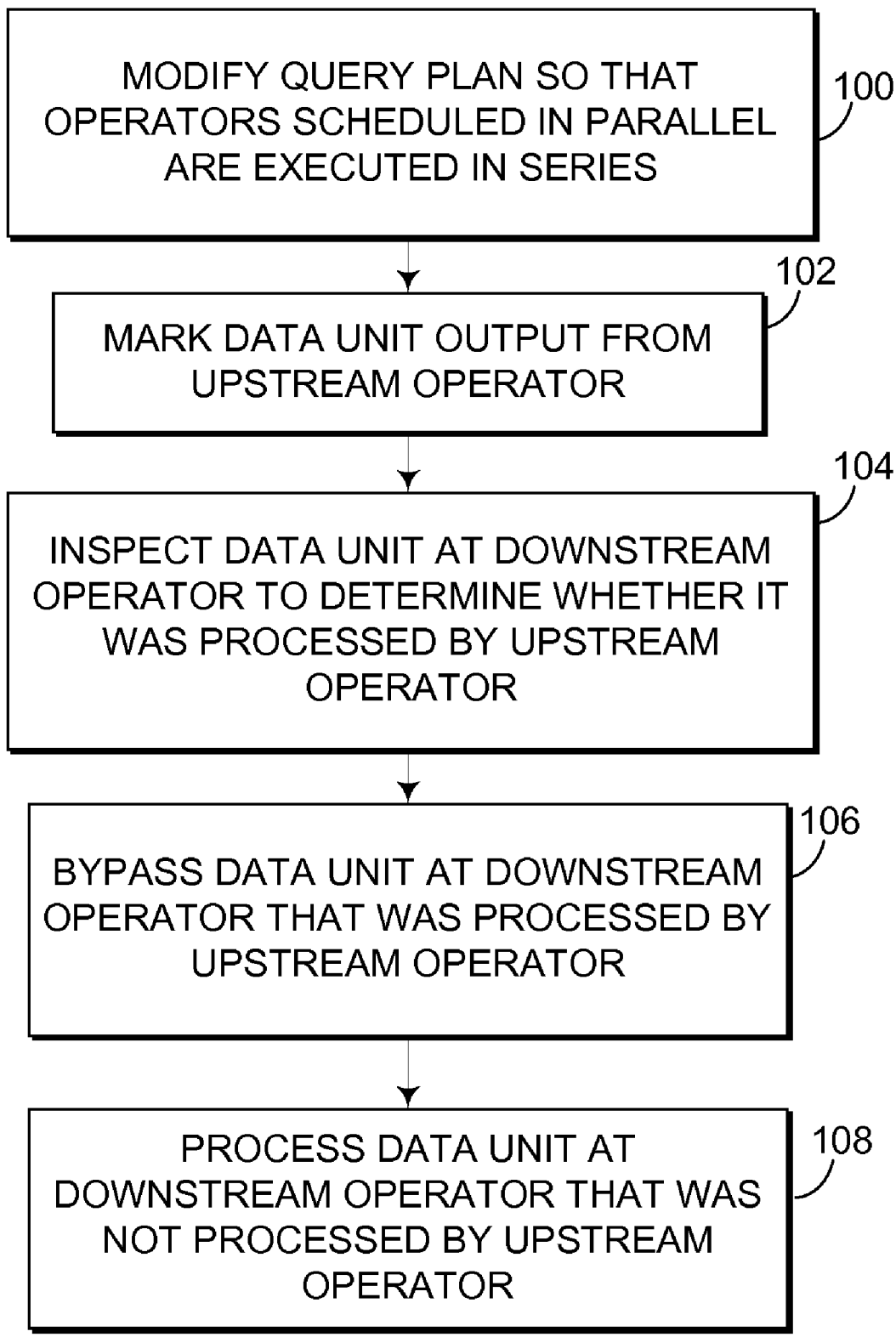
FIG. 3 depicts an exemplary method of transforming a DAG query plan into a linear query plan, according to an embodiment of the invention.

Marking tuples with metadata and inspecting metadata associated with tuples may be accomplished in various ways. In FIG. 3, for example, each operator is assigned an input bitmap and an output bitmap. The input map may be used to inspect bitmaps concatenated with incoming tuples. The output bitmaps may be used to mark outgoing tuples as processed. In the case of an operator that originally had multiple inputs, such as a join operator, multiple bitmaps may be assigned to the operator, one for each input queue, to determine whether an incoming tuple is on the left or right side of a SQL join operation.

Bitmaps may be assigned (e.g., by a user) to operators chronologically (e.g., left-to-right in FIG. 3) so that each operator will process the same tuples it would have processed before the query plan was linearized, and either allow other tuples to bypass or drop tuples altogether. It may be possible to reuse bitmaps in more than one operator where first operator is configured to drop particular tuples, as will be explained below.

The number of bits required in the bitmaps may be dictated by an operator having the maximum number of inputs. For example, in FIG. 1, operator $\sigma_5$ receives tuples from three operators. Accordingly, a bitmap having at least three bits is required in order for operator $\sigma_5$ in FIG. 2 to determine which operator a tuple is supposed to have arrived from (the leftmost bit in the bitmaps of FIG. 2 technically is not necessary). In some embodiments, the length of bitmaps that are concatenated with tuples may be less than or equal to a word length (e.g., 32 bits, 64 bits) of a computer system executing a query plan, so that it is possible to compare bitmaps in a single CPU cycle.

Each operator, or a scheduler that is in charge of executing the operators, may be configured to mark, or "enrich" tuples processed by the operator. For example, in FIG. 2, each operator is provided with an output bitmap that may be used to mark tuples output by the operator (e.g., by concatenation). Operator $\sigma_0$ is provided with an output bitmap of 0001. Each tuple processed by $\sigma_0$ may be marked as processed by $\sigma_0$ by concatenating the output tuple with the bitmap 0001.

Each operator, or a scheduler that is in charge of executing the operators, also may be configured to inspect each tuple that arrives at an input queue of the operator. For example, operator $\sigma_1$ is provided with an input bitmap of 1111. A bitmap concatenated with each tuple in an input queue of $\sigma_1$ may be compared (e.g., using an AND operator) with the input bitmap of $\sigma_1$ to determine whether the tuple should bypass $\sigma_1$, be processed by $\sigma_1$ or be dropped at $\sigma_1$. Because the input bitmap of $\sigma_1$ is 1111, any bitmap other than 0000 that is compared with this input bitmap will result in a true result. Because every tuple in the input queue of $\sigma_1$ will be marked with the output bitmap 0001 at $\sigma_0$, every tuple received in the input queue of $\sigma_1$ will be processed by $\sigma_1$.

The other operators of FIG. 2 also are provided with input and output bitmaps. Operator $\sigma_1$ is provided with an output bitmap of 0010. Operator $\sigma_2$ is provided with identical input and output bitmaps of 0001. Operator $\sigma_3$ is provided with an input bitmap of 0001 and an output bitmap of 0100. Operator $\sigma_4$ is provided with identical input and output bitmaps of 0001. Operator $\sigma_5$ is provided with an input bitmap of 0111 and an output bitmap of NULL.

Because $\sigma_0$ is the first operator of query plan 10, and because every tuple that passed through query plan 10 passes through $\sigma_0$, in FIG. 2 $\sigma_0$ has an input bitmap of NULL. That means every tuple that is received at an input queue of $\sigma_0$ is processed by $\sigma_0$. An output bitmap value of NULL may indicate that the operator is the last operator in the query plan. In some embodiments, tuples output from such an operator may be stripped of metadata.

As noted above, two or more operators originally scheduled to execute in parallel, such as a$\sigma_1$ and $\sigma_2$ in FIG. 1, may be instead executed in series, as shown in FIG. 2. However, in order for the altered query plan to produce the same result as the original DAG query plan, the later-executed operators ($\sigma_2$) may need to receive and process the same tuples that they would have received and processed when scheduled in parallel with the first operator ($\sigma_1$).

Accordingly, the operator that is executed first ($\sigma_1$) and other operators that will be executed before the last operator may be configured to output not only tuples they have processed, but also tuples they received as input that are not marked or processed. Later-executed operators (e.g., $\sigma_2$) may be configured so that tuples processed by earlier operators (e.g., $\sigma_1$) bypass the later-executed operators, as these tuples would not have originally been received or processed by the later-scheduled operators when they were scheduled in parallel with the first operator. On the other hand, copies of tuples received by later-scheduled operators ($\sigma_2$) that are in the same form in which they were received by earlier-executed operators (e.g., $\sigma_1$) may be processed by the later-scheduled operators.

For example, in FIG. 2, operator $\sigma_2$ outputs tuples that it would have output in the original DAG query plan of FIG. 1, plus tuples processed by $\sigma_1$. In fact, tuples processed by $\sigma_1$ may bypass operators $\sigma_{2-4}$ altogether until they reach $\sigma_5$, which is the next operator to process them. These are the same tuples that would have passed directly from $\sigma_1$ to $\sigma_5$ in FIG. 1. Similarly, $\sigma_3$ outputs tuples that it would have output in the original DAG query plan 10 of FIG. 1, and it also allows copies of tuples processed by $\sigma_2$ and tuples processed by $\sigma_1$ to bypass and be processed directly by $\sigma_4$. Likewise, $\sigma_4$ outputs tuples that it would have output in the original DAG query plan of FIG. 1, and it also allows tuples processed by $\sigma_3$ and $\sigma_1$ to bypass. In other words, tuples that would have originally passed directly from $\sigma_3$ to $\sigma_5$ in FIG. 1 are instead bypassed through $\sigma_4$ in FIG. 2.

In some embodiments, all operators are configured by default to output not only tuples they have processed, but also copies of tuples that they received in their original form, without changing the bitmap. In such cases it may be necessary to ensure that an operator that was originally scheduled to execute in parallel other operators, but that now is scheduled to execute last in a series after the other operators, does not output copies of tuples in original form. Accordingly, some operators may be configured to drop, or at least not output copies of, tuples in original form.

For example, an operator with identical input and output bitmaps, such as $\sigma_2$ and $\sigma_4$ in FIG. 2, may be configured to drop tuples received at its input queue. In the case of $\sigma_2$, it can be seen that in the original DAG query plan of FIG. 1, all tuples output directly from $\sigma_0$ would have been processed by both $\sigma_1$ and $\sigma_2$, but no tuples output directly from $\sigma_0$ would have been processed by any other operators (because no edges lead from $\sigma_0$ to any other operators besides $\sigma_1$ or $\sigma_2$). Because $\sigma_2$ is executed after $\sigma_1$ in the altered query plan of FIG. 3, $\sigma_2$ may be configured to drop tuples in original form.

FIG. 3 depicts an exemplary method of linearizing a DAG query plan. In step 100, a DAG query plan such as those shown in FIGS. 1 and 2 may be modified so that operators originally scheduled to be executed in parallel are instead executed in series as an upstream operator and a downstream operator. Examples of this are seen in FIGS. 1-2, where $\sigma_1$ and $\sigma_2$ are originally scheduled in parallel in FIG. 1, but are rescheduled to be executed in series in FIG. 2, with $\sigma_1$ being the upstream operator and $\sigma_2$ being the downstream operator. Likewise, $\sigma_3$ and $\sigma_4$ are originally scheduled in parallel in FIG. 1, but are rescheduled to be executed in series in FIG. 2, with $\sigma_3$ being the upstream operator and $\sigma_4$ being the downstream operator.

Data units such as tuples output from upstream operators may be marked in step 102 so that downstream operators are able to inspect incoming tuples at step 104 to determine whether a tuple was processed by the upstream operator. Marking a tuple may include concatenating (e.g., appending) a bitmap with the tuple. For example, in FIG. 2, $\sigma_3$ is configured to mark each output tuple with the bitmap 0100. Inspecting a tuple may include comparing a bitmap concatenated with an incoming tuple to an input bitmap (e.g., using bitwise comparison such as an AND operator). For example, in FIG. 2, $\sigma_4$ is configured to bitwise compare (e.g., using AND operator) a bitmap concatenated with each incoming tuple with its input bitmap, 0001.

At step 106, an incoming tuple that has already been processed by an upstream operator may bypass a downstream operator. For example, in FIG. 2, tuples processed by $\sigma_1$ are marked with the bitmap 0010. Tuples received at $\sigma_2$ may be inspected by comparing their bitmaps with the input bitmap of $\sigma_2$, 0001. A tuple processed by $\sigma_1$ will be concatenated with 0010, which when bitwise compared (e.g., using AND) with the input bitmap of $\sigma_2$ produces a false result. Accordingly, such a tuple is not processed by $\sigma_2$ and instead bypasses $\sigma_2$ for the next operator, which in FIG. 2 is $\sigma_3$.

At step 108, a tuple that was not processed by an upstream operator may be processed by the downstream operator. For example, in FIG. 2, $\sigma_2$ may receive tuples that are both marked as processed by $\sigma_1$ and tuples that are not marked as processed by $\sigma_1$. As noted above, the tuples marked as processed by $\sigma_1$ may bypass $\sigma_2$ at step 106. However, the copies of tuples originally received by $\sigma_1$ that are output by $\sigma_1$ are also received at $\sigma_2$. Because these tuples are not marked as processed by $\sigma_1$, they are processed by $\sigma_2$ and marked according to the output bitmap of $\sigma_2$.

Consider the path of a single tuple in FIG. 2. The tuple is marked with a bitmap of 0010 when output from $\sigma_1$. With this marking, the tuple bypasses $\sigma_2$, as noted above, because 0010 ANDed with the input bitmap of $\sigma_2$ (0001) returns false. The tuple also bypasses $\sigma_3$ (0010 AND 0001=false) and $\sigma_4$ (0010 AND 0001=false). This is similar to how tuples were processed in the original DAG query plan of FIG. 1; tuples output from $a_1$ are not processed by $\sigma_2$, $\sigma_3$ or $\sigma_4$. The tuple lastly is processed by $\sigma_5$ because 0010 and 0111=true. In fact, all tuples are processed by $\sigma_5$ because all tuples were processed by $\sigma_5$ in the original DAG query plan shown in FIG. 1.

A multi-input operator may have multiple input bitmaps to determine how an incoming tuple should be processed. For example, in FIG. 1, $\sigma_5$ receives tuples from three input queues that correspond to output of $\sigma_3$, $\sigma_4$ and $\sigma_1$. Accordingly, in FIG. 2, instead of a single input bitmap of 0111, $\sigma_5$ may have three separate input bitmaps: 0010, which corresponds to the output bitmap $\sigma_1$; 0100, which corresponds to the output bitmap of $\sigma_3$; and 0001, which corresponds to the output bitmap of $\sigma_4$. These three input bitmaps are represented collectively by the single input bitmap of $\sigma_5$ shown in FIG. 4, 0111.

Figure 4:
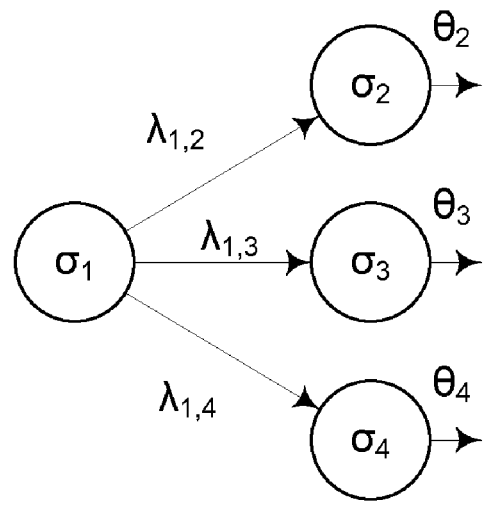
FIG. 4 depicts schematically a portion of an exemplary DAG query plan with operators that each have a selectivity $\theta_x$.
Figure 5:
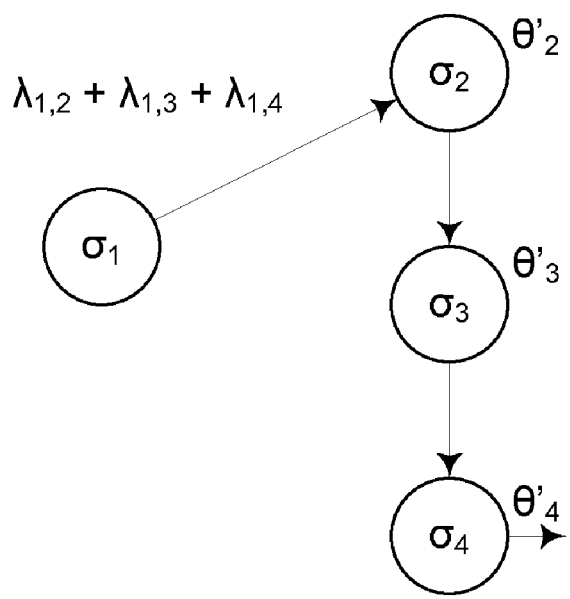
FIG. 5 depicts schematically the portion of the DAG query plan of FIG. 4 transformed to a linear plan, according to an embodiment of the invention.

Some query plan optimization algorithms, particularly those that operate on linear query plans, require certain knowledge about each operator in the plan, such as an operator's selectivity. Accordingly, so long as the selectivity of operators of a DAG query plan are known, selectivity of each operator in a linear query plan created from the DAG query plan using disclosed methods and systems may be calculated. FIG. 4 depicts an exemplary portion of a DAG query plan where the number of tuples that will be passed from operator $\sigma_x$ to $\sigma_y$ is shown as $\lambda_{x,y}$, and the selectivity of operator $\sigma_x$ is $\theta_x$. Suppose the DAG query plan of FIG. 4 is linearized as $\sigma_1 \rightarrow \sigma_2 \rightarrow \sigma_3 \rightarrow \sigma_4$, so that it becomes the linear query plan shown in FIG. 5. Then the selectivity $\theta'_i$ of each operator $\sigma_i$ of the linear query plan of FIG. 5 can be calculated as follows:

$$\theta'_2 = (\lambda_{1,2}\theta_2 + \lambda_{1,3} + \lambda_{1,4})/(\lambda_{1,2} + \lambda_{1,3} + \lambda_{1,4})$$

$$\theta'_3 = (\lambda_{1,2}\theta_2 + \lambda_{1,3}\theta_3 + \lambda_{1,4})/(\lambda_{1,2}\theta_2 + \lambda_{1,3} + \lambda_{1,4})$$

$$\theta'_4 = (\lambda_{1,2}\theta_2 + \lambda_{1,3}\theta_3 + \lambda_{1,4}\theta_4)/(\lambda_{1,2}\theta_2 + \lambda_{1,3}\theta_3 + \lambda_{1,4})$$

Once the selectivity of the operators in a linear query plan are known, it is possible to take advantage of query plan optimization algorithms that formerly were inapplicable (or not as applicable) to DAG query plans.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A computer-based method of transforming a directed acyclic graph ("DAG") query plan into a linear plan, the plan including a first operator and a second operator originally scheduled to be executed in parallel, comprising:
    modifying the query plan so that the first and second operators are executed in series as an upstream operator and a downstream operator;
    marking a data unit output from the upstream operator to indicate that the data unit has been processed by the upstream operator, wherein marking the data unit output from the upstream operator includes concatenating the data unit output from the upstream operator with a bitmap;
    concatenating each data unit output from the upstream operator with an output bitmap of the upstream operator;
    comparing a bitmap concatenated with each data unit output from the upstream operator to an input bitmap of the downstream operator; and
    inspecting the data unit received as input at the downstream operator to determine whether the data unit has been marked.

2. The method of claim 1, wherein comparing the bitmap concatenated with each data unit output from the upstream operator with the input bitmap of the downstream operator is done using an AND operator.

3. The method of claim 2, further comprising marking the data unit output from the downstream operator to indicate that it has been processed by the downstream operator.

4. The method of claim 3, wherein marking the data unit output from the downstream operator includes concatenating the data unit with an output bitmap of the downstream operator.

5. The method of claim 1, further comprising outputting a second data unit from the upstream operator that is equivalent to an original data unit received at an input queue of the upstream operator.

6. The method of claim 5, further comprising: bypassing, at the downstream operator, the data unit where the data unit is marked as processed by the upstream operator; and processing, at the downstream operator, the second data unit.

7. The method of claim 5, further comprising inspecting, at an input queue of a join operator downstream from the downstream operator, the data unit to determine whether the data unit is on a left or right side of a join operation.

8. A non-transitory computer-readable storage medium having computer-executable instructions for executing a directed acyclic graph ("DAG") query plan in series, the instructions causing a computer to perform steps comprising:
   executing, in series as an upstream operator and a downstream operator, first and second operators originally scheduled to be executed in parallel;
   marking a data unit processed by the upstream operator with an output bitmap of the upstream operator,
   wherein marking the data unit processed by the upstream operator includes concatenating the data unit output from the upstream operator with a bitmap;
   concatenating each data unit processed by the upstream operator with an output bitmap of the upstream operator,
   comparing a bitmap concatenated with each data unit processed by the upstream operator to an input bitmap of the downstream operator; and
   bypassing, at the downstream operator, the data unit marked as processed by the upstream operator.

9. The computer-readable storage medium of claim 8, wherein marking the data unit processed by the upstream operator includes concatenating the data unit output from the upstream operator with the output bitmap of the upstream operator.

10. The computer-readable storage medium of claim 8, further including computer-executable instructions for processing, at the downstream operator, a second data unit that is not marked as processed by the upstream operator.

11. The computer-readable storage medium of claim 10, further including computer-executable instructions for outputting a third data unit from the upstream operator that is equivalent to an original data unit received at an input queue of the upstream operator and that is not marked as processed by the upstream operator.

12. The computer-readable storage medium of claim 8, further including computer-executable instructions for: comparing, at an input queue of a join operator downstream from the downstream operator, a bitmap concatenated with a second data unit to a first input bitmap of the join operator to determine whether the second data unit is part of a left side of a join operation; and comparing, at the input queue of the join operator, the bitmap concatenated with the second data unit to a second input bitmap of the join operator to determine whether the data unit is part of a right side of a join operation.

13. The computer-readable storage medium of claim 8, further including computer-executable instructions for comparing the output bitmap of each data unit output from the upstream operator with an input bitmap of the downstream operator using an AND operator.

14. A computer system configured for stream processing, comprising:
   means for altering a query plan so that first and second operators originally scheduled to be executed in parallel are instead executed in series as an upstream operator and a downstream operator; and
   means for ensuring that data units processed by the upstream operator are not processed again by the downstream operator and that data units that are not processed by the upstream operator are processed by the downstream operator, the means further for:
   marking a data unit output from the upstream operator including concatenating the data unit output from the upstream operator with a bitmap;
   concatenating each data unit output from the upstream operator with an output bitmap of the upstream operator;
   comparing a bitmap concatenated with each data unit output from the upstream operator to an input bitmap of the downstream operator;
   inspecting the data unit received as input at the downstream operator to determine whether the data unit has been marked.

15. The computer system of claim 14, wherein the means for ensuring include an output bitmap that is appended to a data unit at the upstream operator and that is compared to an input bitmap of the downstream operator.

16. The computer system of claim 15, wherein the output bitmap is concatenated with the data unit at the upstream operator when the data unit is processed by the upstream operator.

17. The computer system of claim 15, wherein the output bitmap that is concatenated with the data unit at the upstream operator is compared to the input bitmap of the downstream operator using an AND operator.

* * * * *